R. 'R' DEBACHER.
PERPETUAL CALENDAR.
APPLICATION FILED MAY 18, 1915.

1,164,267.  Patented Dec. 14, 1915.

Witness:
Harry J. Fleischer

Inventor:
Robert R. Debacher

UNITED STATES PATENT OFFICE.

ROBERT 'R' DEBACHER', OF HOBOKEN, NEW JERSEY.

PERPETUAL CALENDAR.

1,164,267. Specification of Letters Patent. Patented Dec. 14, 1915.

Original application filed November 28, 1914, Serial No. 874,426. Divided and this application filed May 18, 1915. Serial No. 28,869.

*To all whom it may concern:*

Be it known that I, ROBERT 'R' DEBACHER', a citizen of the United States, and resident of Hoboken, in the county of Hudson and State of New Jersey, have invented a new and useful Improvement in Perpetual Calendars, of which the following is a specification.

This invention relates to perpetual calendars, with the object in view of providing improvements in the form, construction and arrangement of the several parts whereby there is promoted simplicity (with its attendant cheapness), compactness and neat appearance.

This application is a division of my application Serial No. 874426, filed November 28, 1914, for improvement in perpetual calendars.

A practical embodiment of my invention is represented in the accompanying drawings, in which—

Figure 1:
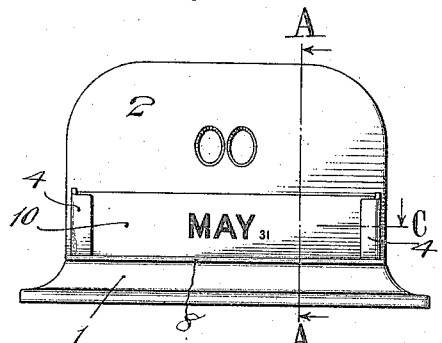
Figure 2:
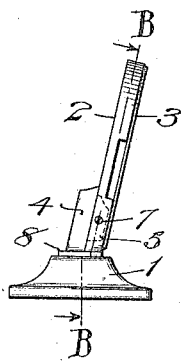
Figure 3:
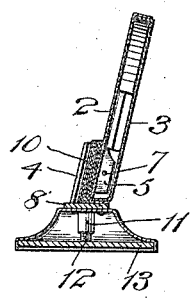
Figure 4:
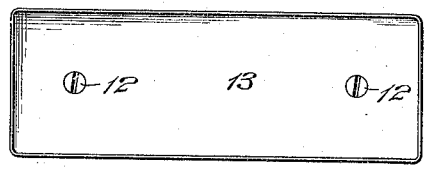
Figures 5, 7:
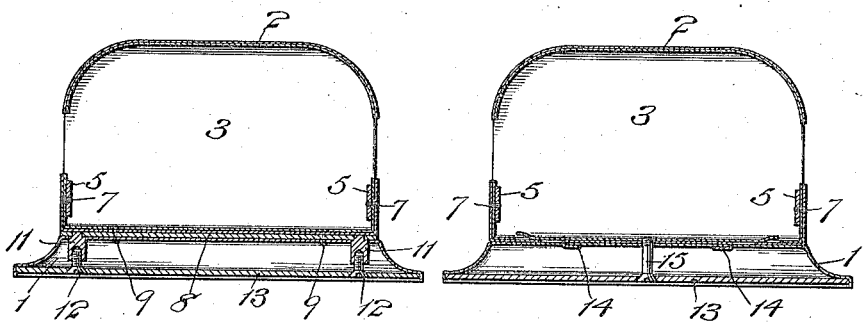
Figure 6:
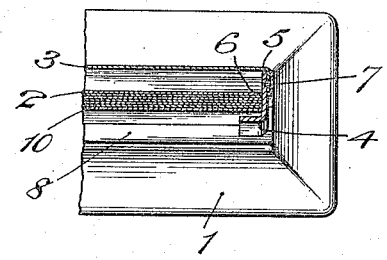

Figure 1 represents a front view of the calendar in assembled form, Fig. 2 represents a side view of the same, Fig. 3 represents a section taken in the plane of the line A—A of Fig. 1, looking in the direction of the arrows, Fig. 4 represents a bottom view, Fig. 5 represents a detail vertical section taken in the plane of the line B—B of Fig. 2, looking in the direction of the arrows, Fig. 6 represents an enlarged detail horizontal section taken in the plane of the line C of Fig. 1, looking in the direction of the arrow, and Fig. 7 represents a view similar to Fig. 5, showing a modified form.

Referring to the preferred form shown in Figs. 1 to 6 inclusive, the calendar structure comprises a base portion, denoted by 1, which may conveniently be composed of stamped sheet metal and have some appropriate form adapted to act as a support for the superstructure. In the present case, the base is shown as substantially oblong with a reduced upper platform or support for the other portions.

The body of the calendar comprises a front member, denoted by 2, and a back member, denoted by 3. These members may both be stamped from an appropriate sheet metal. They are flanged around their edges, which flanges project at right angles to the main portions thereof, and one of the members is made sufficiently smaller than the other so that it may be received within the latter with the peripheral flanges overlapping and abutting. In the present instance the rear member 3 is shown as fitted in the front member 2. This arrangement serves to provide a better appearance to the front of the calendar. The calendar also includes a pair of brackets 4, fitted to receive and hold cards, such as strips of celluloid, having the months of the year printed thereon. These brackets consist of angle pieces bent from sheet metal, and are each provided with ears 5, adapted to pass rearwardly through slits 6 fashioned in the front member 2 near the edges and at the lower portion thereof. The ears 5 of the brackets 4 are drilled and tapped in order to receive the threaded ends of screws 7, which latter are arranged to pass through registering holes in the flanges of the parts 2, 3, and engage the ears 5, for the purpose of firmly holding the parts 2, 3 and 4 in assembly. It will be observed that in this assembly the ears 5 act substantially as nuts for the screws 7, as well as to hold the brackets 4 in an appropriate position.

To the lower flange of the front member 2, there is secured a base plate 8, the union between these two parts being conveniently accomplished by means of rivets 9. This base plate 8 serves as a support for the cards heretofore referred to, having the months of the year printed thereon, and which may be denoted by 10; as well as operating as a point of attachment for a pair of interiorly screw-threaded lugs 11 which are arranged to coincide with a pair of holes through the upper portion of the base 1. These lugs 11 are used as a means of securing the front member 2 to the base 1, through the agency of screws 12 which pass through a washer plate 13 adapted to fit snugly within the bottom of the base 1, which screws 12 are adapted for the customary engagement with the aforesaid interior threads in the lugs 11. The heads of the screws 12 may be countersunk in the washer plate 13, in order that they may be flush therewith, as clearly shown in Fig. 5. It is desirable to make the washer plate 13, from a piece of relatively heavy metal, such, for instance, as one-sixteenth inch thick iron or steel, in order that it may give strength to the base and also, by reason of its weight, serve to steady the calendar and resist forces tending to upset the latter.

The modified form shown in Fig. 7 is similar to the form already described except that the base plate 8 is omitted and the front member 2 is secured directly to the upper portion of the base 1 by means of a pair of ears 14 which are struck from the front member 2 and pass through slits in the base 1, within which they are crimped. This fastening is reinforced by a screw 15 which passes through holes in the washer plate 13, and the top of the base 1, and is threaded into the lower flange of the front member 2.

It will be understood that various changes may be resorted to in the form, construction and arrangement of the several parts without departing from the spirit and scope of my invention, and hence I do not intend to be limited to specific features except as they may be set forth in the claims.

What I claim is:

1. A perpetual calendar comprising a front and back, the one adapted to fit within the other, the said front having slits therethrough, card holding brackets provided with ears adapted to pass rearwardly through said slits, and means fitted to pass through the ends of the said front and back and engage the said ears for securing the front and back together and the brackets in position.

2. A perpetual calendar comprising a front and back, the one adapted to fit within the other, the said front having slits therethrough, card holding brackets provided with ears adapted to pass rearwardly through said slits, and screws fitted to pass through the ends of the said front and back and engage the said ears for securing the front and back together and the brackets in position.

3. A perpetual calendar comprising a front and back having peripheral flanges, the one adapted to fit within the other, the said front having slits therethrough, card holding brackets provided with ears adapted to pass rearwardly through said slits, and means fitted to pass through the flanges of the said front and back and engage the said ears for securing the front and back together and the brackets in position.

4. A perpetual calendar comprising front and back members, the one adapted to fit within the other, the said front having slits therethrough, card holding brackets provided with ears adapted to pass rearwardly through said slits, means fitted to pass through the ends of the said front and back and engage the said ears for securing the front and back together and the brackets in position, a base, and means for securing the base to the front member.

In testimony, that I claim the foregoing as my invention, I have signed my name this seventeenth day of May 1915.

ROBERT 'R' DEBACHER'.

Copies of this patent may be obtained for five cents each, by addressing the "Commissioner of Patents, Washington, D. C."